Figure 1:
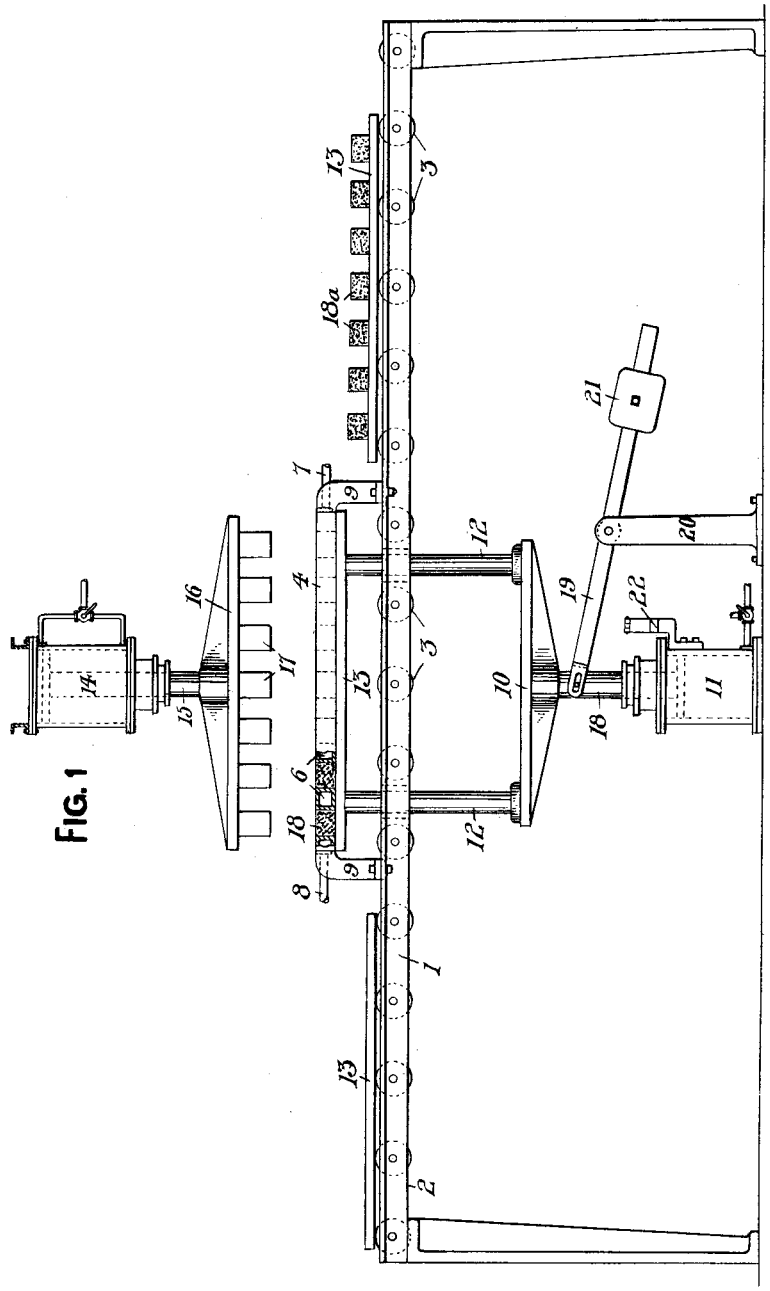

A. A. PAULY.
MOLDING APPARATUS.
APPLICATION FILED JAN. 23, 1911.

1,029,559.

Patented June 11, 1912.

2 SHEETS—SHEET 1.

WITNESSES:

INVENTOR.
BY A. A. Pauly
F. N. Barber
ATTORNEY.

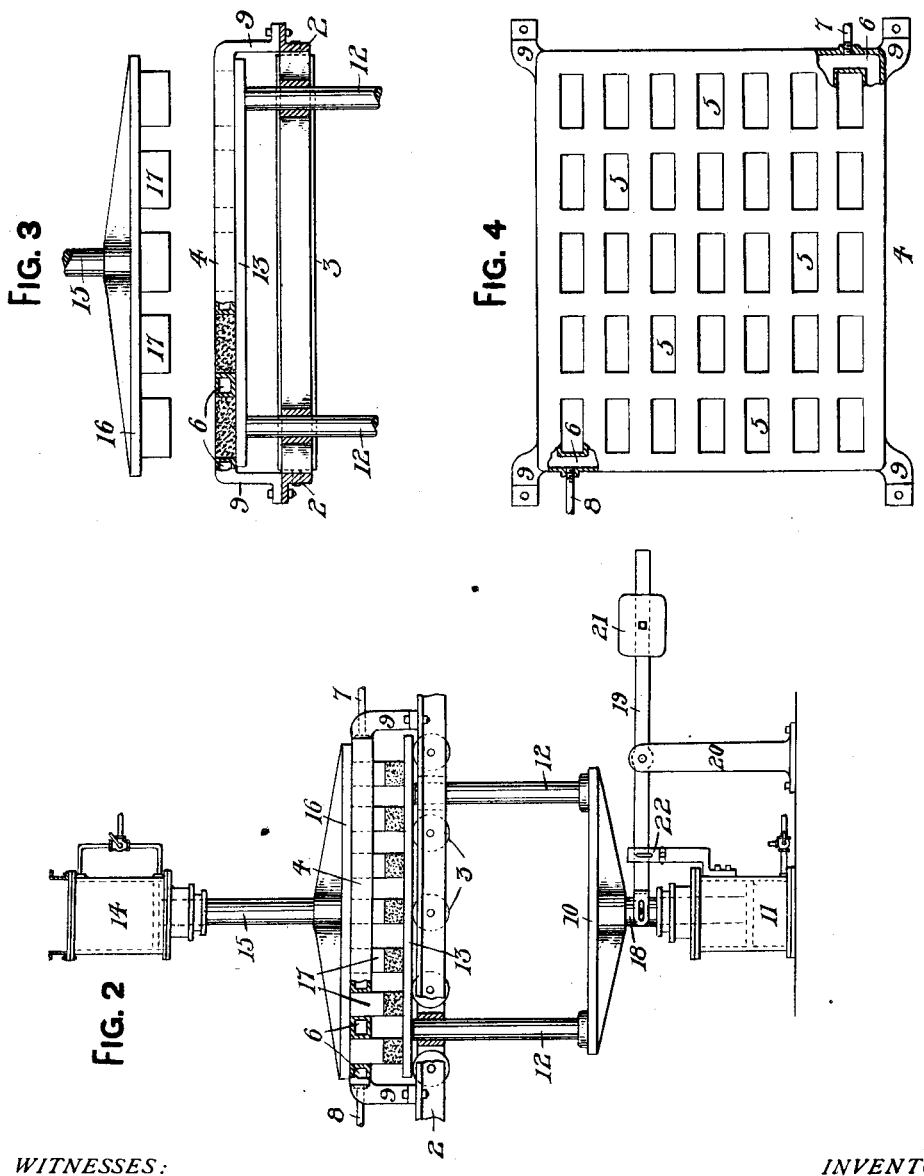

UNITED STATES PATENT OFFICE.

ALBERT A. PAULY, OF YOUNGSTOWN, OHIO.

MOLDING APPARATUS.

1,029,559.  Specification of Letters Patent.  Patented June 11, 1912.

Application filed January 23, 1911. Serial No. 604,052.

*To all whom it may concern:*

Be it known that I, ALBERT A. PAULY, a citizen of the United States, residing at Youngstown, in the county of Mahoning and State of Ohio, have invented new and useful Improvements in Molding Apparatus, of which the following is a specification.

My invention relates generally to apparatus for molding bricks but it has particular reference to the manufacture of cement bricks or blocks.

The object of my invention is to provide an improved apparatus whereby the bricks may be rapidly formed on pallets or removable mold bottoms which support the bricks during their formation and also during and after their ejection from the mold body.

Other objects will appear hereinafter.

Referring to the accompanying drawings, Figure 1 is a side elevation of one form of my invention, a portion thereof being shown in vertical section; Fig. 2, a side elevation of the central portion of Fig. 1, parts being shown in vertical section; Fig. 3, a vertical section partially in elevation showing the central portion of Fig. 2 at right angles thereto; and Fig. 4, a plan partly broken away of the mold body.

On the drawings, 1 represents a horizontal bed having the side rails 2 in which the ends of the horizontal parallel rollers 3 are journaled, the top of the rollers being above the rails 2 and all at the same level, the said rails and rollers constituting a fixed conveyer for the pallets, hereinafter to be described.

4 designates the mold body having preferably a number of mold cavities 5 surrounded by the steam or hot water space 6 connected so as to surround each mold cavity.

7 is an inlet pipe to supply the water or steam space with water or steam and 8 is the outlet pipe.

The mold body 4 is arranged centrally of the bed 1 and is supported above the same on the legs 9, which are secured to the side rails 2.

Below the mold body is the vertical reciprocating cross-head 10 operated from the power cylinder 11. The cross-head carries the vertical supports 12 which have their upper ends slightly below the tops of the rollers 3 when the cross-head is in its lowest position, as shown in Fig. 2.

13 represents a pallet or mold bottom which is passed along on the rollers 3 so as to lie immediately below the mold body 4. Power is applied to the cylinder 11 to cause the cross-head 10 to move the supports 12 and the pallet 13 upwardly so that the latter engages and closes the under side of the mold body 4, as shown in Figs. 1 and 3.

14 is a second power cylinder arranged above the mold body 4 and having its piston rod 15 supporting the ejector 16 provided with the ejector-projections 17 on the under side thereof, arranged to enter the mold cavities 5 and eject the molded bricks therefrom.

The piston rod 18, which supports the cross-head 10, has the lever 19 pivotally connected thereto, the said lever having its intermediate portion pivoted to the support 20. The weight 21 is adjustable on the lever 19.

22 is a spring catch arranged to engage the end of the lever next to the piston-rod 18, and prevent its upward movement when in its lowest position.

The operation is as follows:—The parts being in the positions shown in Figs. 1 and 3, the mold cavities 5 are supplied with cement or other brick or block making material 18, a circulation of steam or hot water being kept up through the various water or steam spaces in the mold body. After the material 18 has become sufficiently hardened in the mold cavities 5, the ejector 16 is lowered so that the projection 17 shall engage the material 18 in the mold cavities. Pressure having been exhausted from the cylinder 11, the cross-head 10 and the ejector 16 are lowered simultaneously, the bricks or blocks being forced out of the mold cavities by the ejector as the supports 12 are lowered the weight 21 keeping the pallet in contact with the bricks or blocks. Finally the pallet 13 is lowered with the bricks or blocks resting thereon until the pallet rests on the rollers 3. The catch 22 then locks the lever 19 in the position shown in Fig. 2, so that it cannot elevate the supports 12 when the pallet loaded with blocks 18ª is moved away from them on the rollers 3 (Fig. 1). A new or fresh pallet 13 is pushed beneath the mold body 4 and the catch 22 is caused to release the lever 19, whereupon the operation detailed is repeated. The pallet with the blocks or bricks 18ª thereon is removed to a drying oven or other suitable place of deposit.

I do not limit myself to any particular form of bricks or blocks nor to the precise apparatus shown and described as the same may be varied in its details without departing from the spirit of my invention.

I claim—

1. A bed having a pair of side rails, a fixed series of parallel rollers supported between the rails, a fixed mold-body supported over the central portion of the bed, a pallet adapted to travel on the rollers and to close the lower ends of mold-spaces in the mold-body, a power actuated support for the pallet arranged below the mold-body and adapted to lift the pallet above the rollers into engagement with the mold-body and to retire below the rollers, and an ejector above the mold body.

2. In a molding machine, a mold-body having an open bottom, a horizontal bed below the same, a pallet adapted to travel on the bed, a cross-head below the bed, pallet-supporting means on the cross-head adapted to engage the pallet and lift it into engagement with the bottom of the mold, means for moving the cross-head upwardly and giving it a yielding upward tendency, and means above the mold-body for pushing molded articles downwardly through the mold-body and delivering the pallet with the molded article thereon to the bed.

Signed at Pittsburgh, Pa., this 17th day of January, A. D. 1911.

ALBERT A. PAULY.

Witnesses:
SUZANNE S. BEATTY,
F. N. BARBER.

Copies of this patent may be obtained for five cents each, by addressing the "Commissioner of Patents, Washington, D. C."